A. R. WILFLEY.
CENTRIFUGAL PUMP.
APPLICATION FILED SEPT. 14, 1918.
1,330,416.
Patented Feb. 10, 1920.
4 SHEETS—SHEET 3.
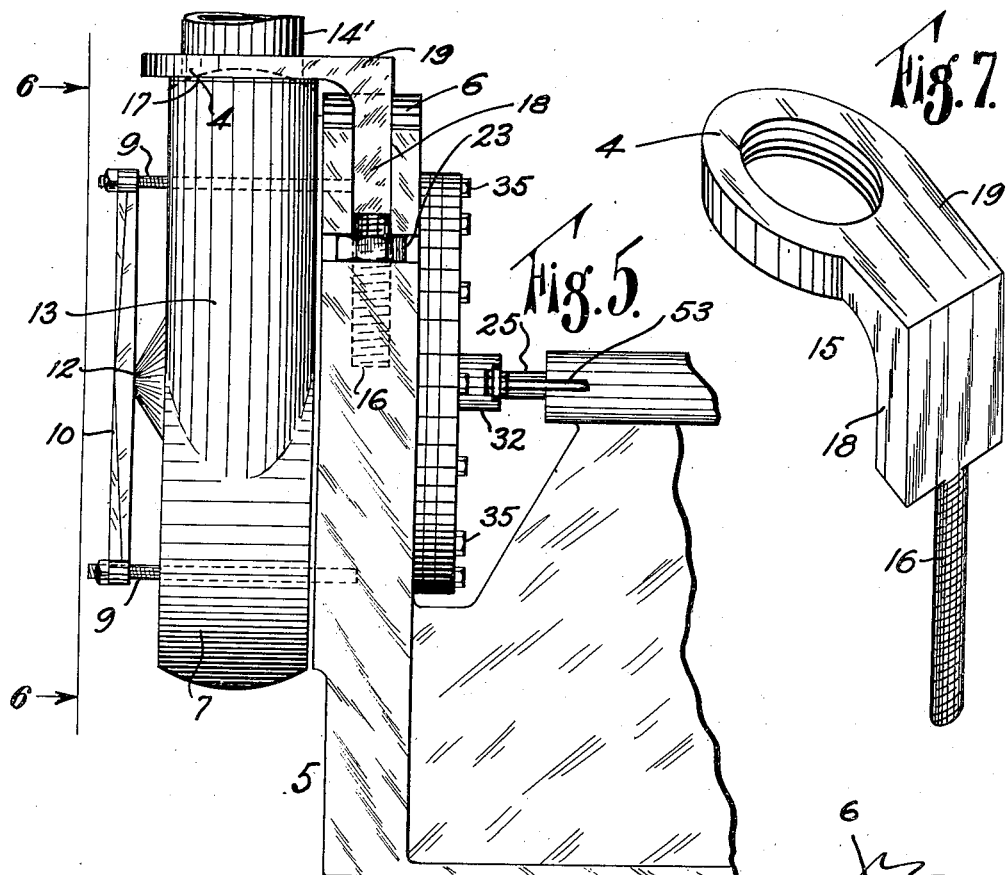
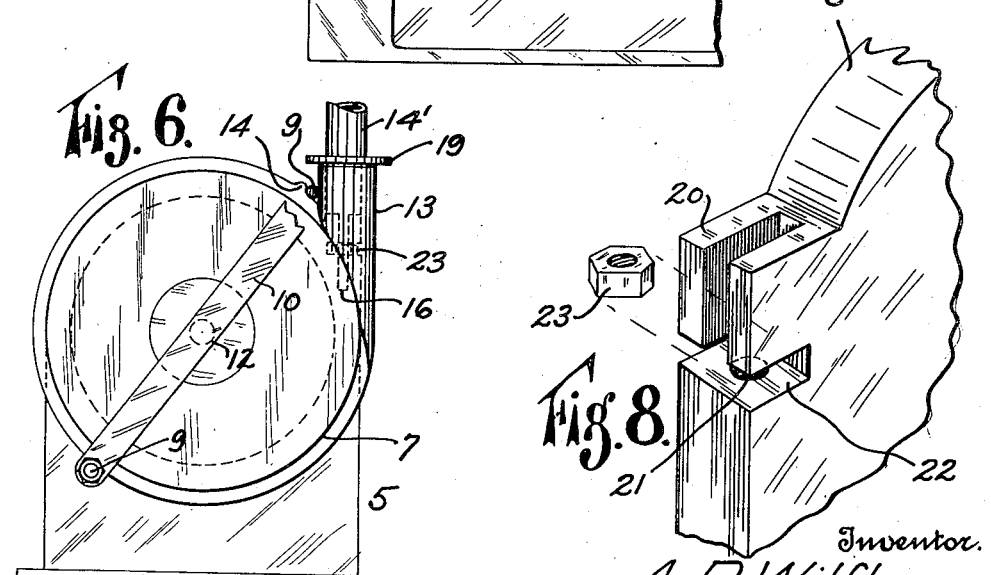
Inventor.
A. R. Wilfley.

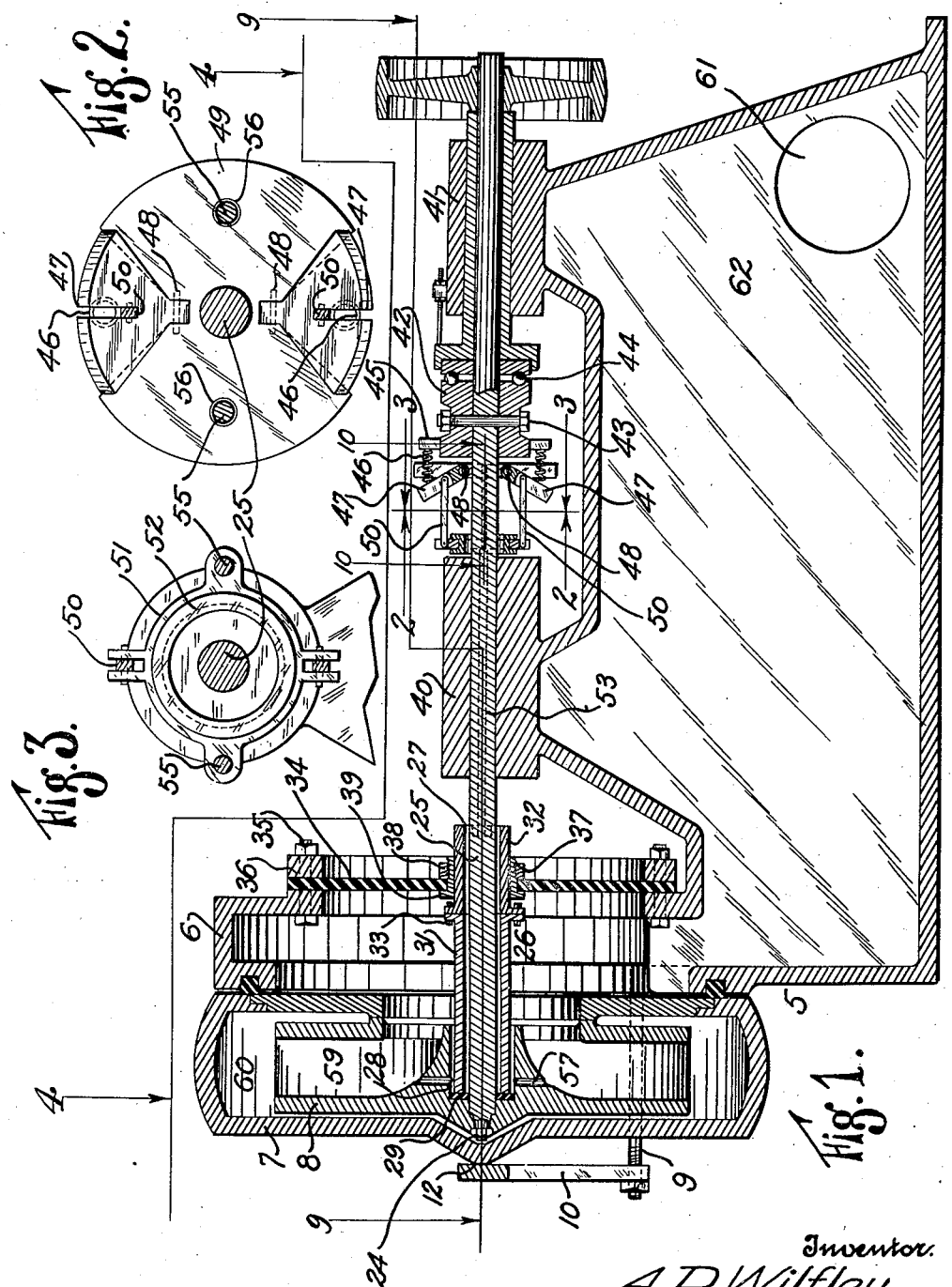

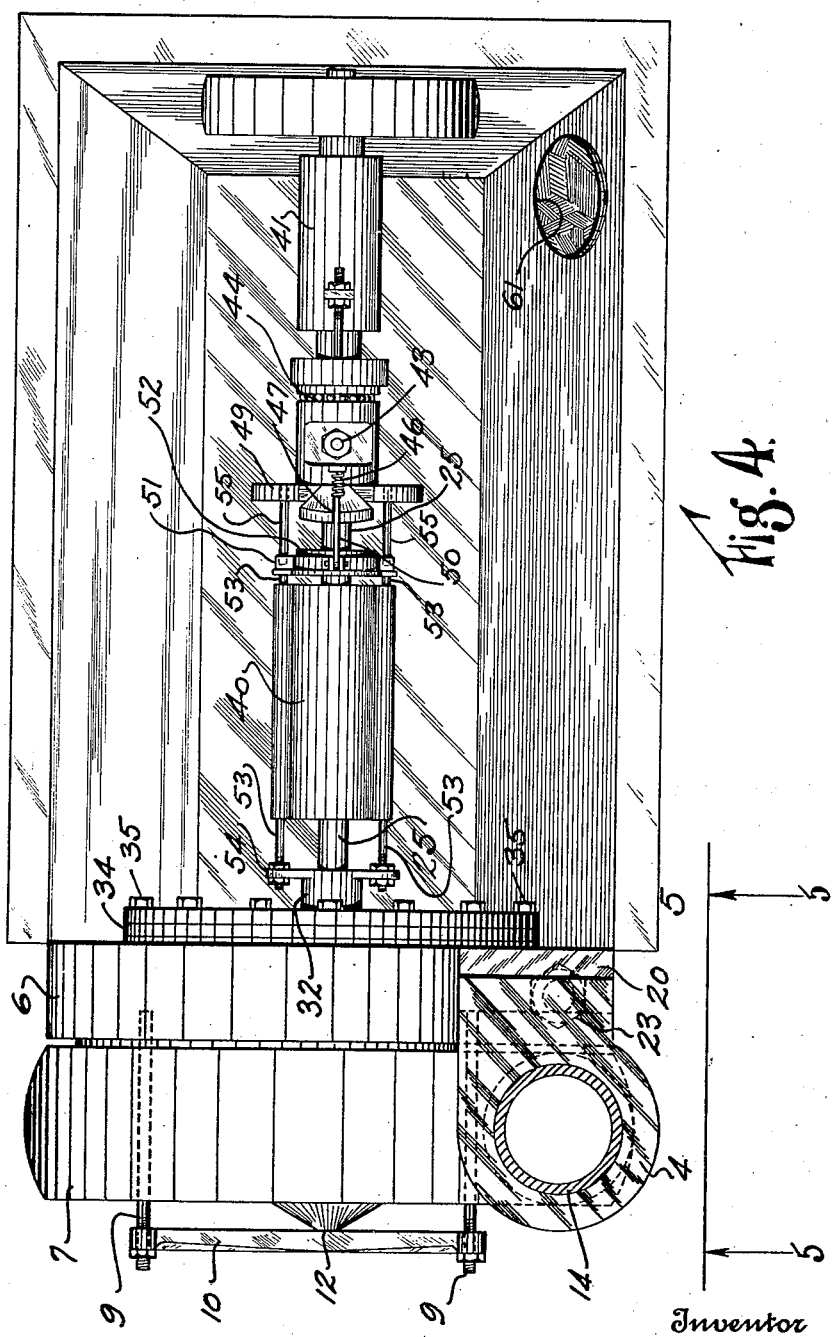

A. R. WILFLEY.
CENTRIFUGAL PUMP.
APPLICATION FILED SEPT. 14, 1918.
1,330,416.
Patented Feb. 10, 1920.
4 SHEETS—SHEET 4.
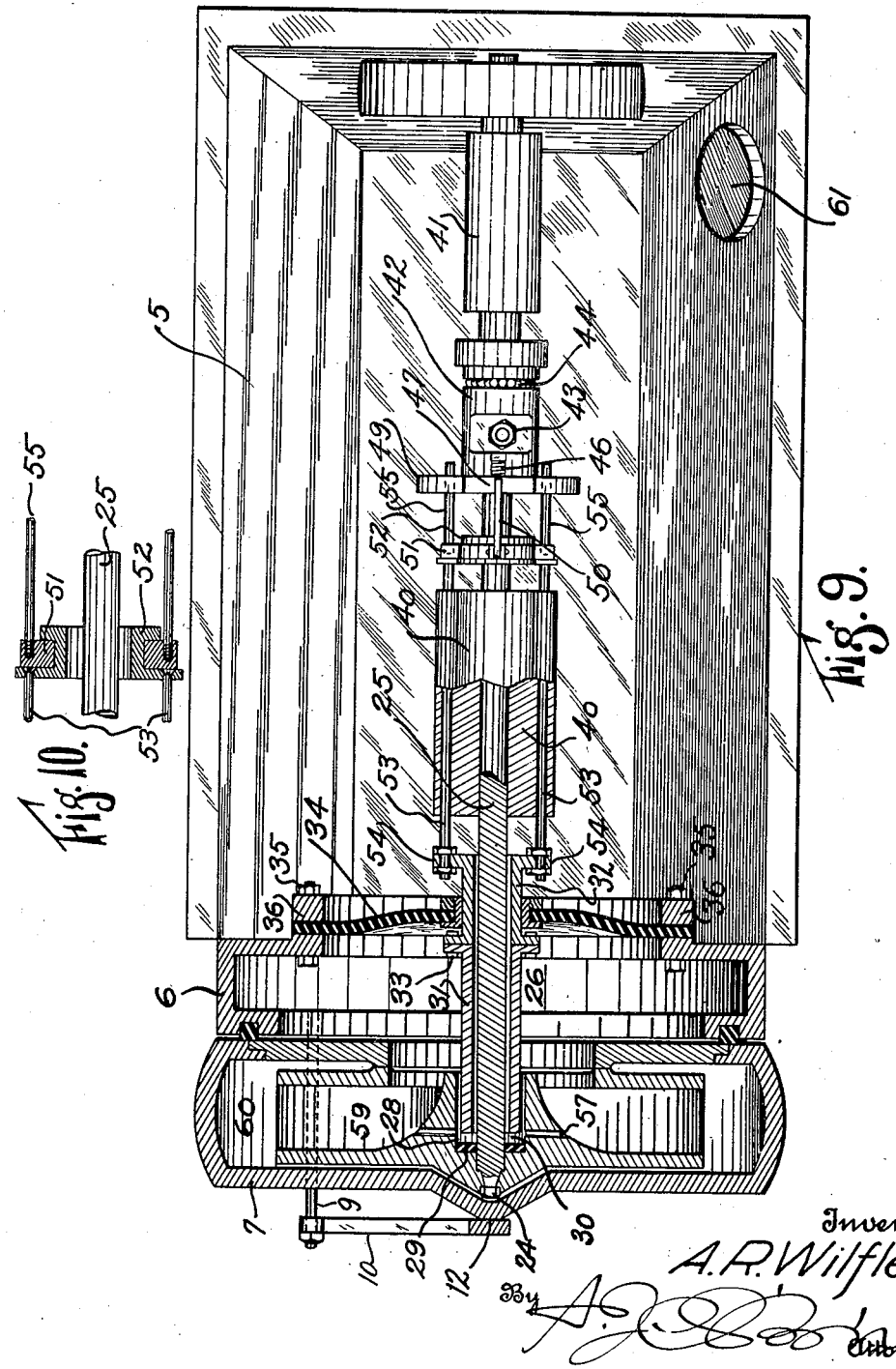

UNITED STATES PATENT OFFICE.

ARTHUR R. WILFLEY, OF DENVER, COLORADO.

CENTRIFUGAL PUMP.

1,330,416.  Specification of Letters Patent.  Patented Feb. 10, 1920.

Application filed September 14, 1918. Serial No. 254,029.

*To all whom it may concern:*

Be it known that I, ARTHUR R. WILFLEY, a citizen of the United States, residing at the city and county of Denver and State of Colorado, have invented certain new and useful Improvements in Centrifugal Pumps; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in centrifugal pumps, my object being to provide a construction in which there may be no wear between the runner shaft and the casing inclosing the runner chamber or an auxiliary air chamber in communication therewith. Heretofore it has always been thought necessary to extend the runner shaft through a packed bearing or stuffing box in order to seal or practically seal the central part of the runner chamber from the atmosphere in order to prevent leakage.

In my improvement the central part of the runner chamber may be in communication with the atmosphere around the runner shaft which means that the runner shaft may be spaced completely from the casing when the pump is in operation, centrifugal force serving to prevent leakage from the runner chamber through the said opening.

In my improved construction as illustrated, I pass the runner shaft through a sleeve which extends into the central portion of the runner cavity, but is spaced from the runner while the shaft is spaced from the sleeve, the sleeve being mounted on a flexible diaphragm to permit vibration both laterally and longitudinally. The sleeve when the pump is stationary is acted on through the instrumentality of governor mechanism to cause it to move endwise into engagement with a packing ring in the runner and surrounding the shaft, whereby when the pump is not in operation a cavity within the runner which communicates with the atmosphere when the pump is running, is sealed when the pump is at rest, thus preventing water or other liquid or semi-liquid material from escaping through the runner and around the shaft where it passes through the sleeve.

Hence, in my improved construction the governor mechanism acts to shift the sleeve and unseal the opening in the runner as soon as the pump is started, and also serves to shift the sleeve in the opposite direction and seal the said opening as soon as the pump stops.

Hence, by virtue of my improvement I do away with contact between the casing and the runner shaft, thus doing away entirely with the wearing of parts where these elements are located.

Having briefly outlined my improvement I will proceed to describe the same in detail, reference being made to the accompanying drawing in which is illustrated an embodiment thereof. In this drawing:

Figure 1 is a vertical longitudinal section taken through a pump equipped with my improvement.

Fig. 2 is a section taken on the line 2—2, Fig. 1, looking toward the right, the parts being shown on a larger scale.

Fig. 3 is a section taken on the line 3—3, Fig. 1, looking toward the left, the parts being shown on a larger scale.

Fig. 4 is a top plan view of the pump looking in the direction of arrows 4, Fig. 1.

Fig. 5 is a fragmentary elevation looking in the direction of arrows 5, Fig. 4.

Fig. 6 is an end elevation looking in the direction of arrows 6, Fig. 5, but shown on a smaller scale.

Fig. 7 is a perspective view illustrating a detail of construction.

Fig. 8 is a fragmentary perspective view of a portion of the construction shown in Fig. 5.

Fig. 9 is a top plan view of the pump shown partly in section on the line 9—9 Fig. 1.

Fig. 10 is a section taken on the line 10—10, Fig. 1.

The same reference characters indicate the same parts in all the views.

Let the numeral 5 designate a stationary casing upon which is mounted an air chamber 6 which is connected with the main casing 7 in which the runner 8 is arranged, the main casing 7 being secured to the auxiliary casing 6 by means of rods 9 which at one extremity are threaded into the casing 6 and whose opposite extremities are connected with a bar 10 which engages the central part 12 of the casing 7. In this way the main casing 7 is supported upon the stationary framework 5. The outlet opening of the casing 7 communicates with the standpipe 13 and one of the rods 9 is arranged between the standpipe 13 and the lug 14 upon the casing, thus anchoring the casing 7 against rotary movement.

The standpipe member 13 which as shown in the drawing is formed integral with the casing 7, is provided with a separable extension 14' which is supported by means of an angle member 15 having an interiorly threaded eye 4 and a threaded stem 16. The lower extremity of the extension 14' is threaded into the eye 4 and is connected with the upper extremity of the member 13 as shown at 17 in such a manner as to form a tight joint. The angle member 15 has a part 18 which extends at right angles to the part 19 in which the eye 4 is formed. The part 18 extends downwardly into a cavity 19 formed in a member 20 of the casing and extending laterally from the auxiliary part 6. The stem 16 which projects downwardly from the part 18 enters a plain or unthreaded opening 21 formed in the part 20 below the cavity 19. In the bottom of the cavity 19 and communicating with the opening 21 is a transverse cavity 22 within which a nut 23 is located, the nut being threaded on the stem 16 when the parts are assembled. Now when it is necessary to raise the extension 14 or disconnect it from the part 13 of the standpipe, it is only necessary to turn the nut 23 in the proper direction, this nut being exposed since the cavity 22 in which it is located is open to permit a wrench to be used on the nut.

The runner 8 is connected as shown at 24 with one extremity of the shaft 25, this shaft extending through a sleeve 26 which is larger than the shaft, the space 27 between the sleeve and the shaft forming communication between the atmosphere and the central portion 28 of the cavity within the runner into which the sleeve extends. At the inner extremity of the central portion 28 of the runner cavity, a packing ring 29 is located, the inner end of the sleeve being separated from this packing ring as shown at 30 when the pump is in operation. The sleeve 26 as shown in the drawing is composed of two parts 31 and 32, these parts having abutting flanges which are connected by fastening devices 33. The part 32 of the sleeve is directly mounted on a flexible diaphragm or partition 34 whose outer edge or periphery is secured to the casing member 6 by bolts 35, a ring 36 being arranged in opposing relation to part 6 through which the bolts pass. A nut 37 is threaded on a collar 38 which is fast on the sleeve part 32 and is provided with a flange 39.

Beyond the sleeve 26 the shaft extends through to bearings 40 and 41 its outer extremity being equipped with an operating pulley. Between the bearings 40 and 41 is arranged an abutment 42 which is secured to the sleeve by a bolt 43. Between this abutment and the bearing 41, bearing balls 44 are arranged. The abutment 42 is provided with lugs 45 which are connected by means of spiral springs 46 with governor members 47, the latter being hinged as shown at 48 to a disk 49 which is fast on the shaft 25. The governor members 47 are connected by means of links 50 with a ring 51 which engages a circumferential groove formed in a collar 52 which is connected with the sleeve member 32 by means of rods 53, the said rods passing through lugs 54 formed on the sleeve part 32 and being secured by nuts on opposite sides of the lugs. The springs 46 will normally by expansive action hold the governor members 47 in the inclined position shown in Figs. 1 and 4, whereby the sleeve 26 is adjusted endwise to cause its inner extremity to engage the packing 29 in the runner, thus sealing the central portion 28 of the cavity within the runner from the atmosphere by way of the space 27 between the sleeve 26 and the shaft 25. Again, as soon as the pump is started and the shaft 25 and the runner begin to rotate, the governor members 47 will be thrown against their compression springs 46 and caused to occupy the plane of the disk 49, this movement shifting the sleeve 26 by virtue of the rod connection between the collar 52 and the sleeve, and the link connection between the governor members 47 and the ring 51. The ring 51 is connected by means of pins 55 with the disk 49 which is provided with openings 56 which the pins slidably engage. By reason of these pins the ring 51 is maintained in proper coöperative relation with the disk 49 and rotates therewith, thus preventing any torsional strain on the links 50 which connect the governor members of the disk with the ring, the rods being sufficiently rigid to perform the aforesaid function.

From the foregoing description the use and operation of my improved centrifugal pump will be readily understood. It should be explained that the sleeve 26 is in reality a part of the casing, and its inner extremity may, if desired, be in contact with the packing 29 at all times, thus dispensing with the governor mechanism and the endwise shifting movement of the sleeve. Under such circumstances the advantage over constructions heretofore used would be that the packing joint which prevents the escape of the liquid which the pump is intended to handle, is located where the centrifugal force is the most active or powerful, thus keeping the packed joint free from the material handled by the pump. But when the pump is in operation the sealing joint is not required since the centrifugal force is so active and powerful where the joint is located that no seal is required. By employing the governor mechanism, whereby the sleeve 26 is shifted longitudinally, all wear upon the packing 29 is obviated, but it must be understood that the invention is of sufficient scope to cover a construction where the inner extremity of the sleeve is constantly in contact with the packing 29 or intermittently in contact therewith, as when the pump is not in operation or at rest as heretofore explained.

In the event that there should be any tendency for pulp or liquid to enter the central portion 28 of the runner cavity when the pump is in operation, this liquid will be drawn out of said cavity by centrifugal force acting through ducts 57 formed in the runner and leading from the central portion 28 to the outer portion 59 of the runner cavity and which communicates at its outer extremity with the chamber 60 in which the runner is located. These ducts may extend from the central portion of the runner cavity through the runner to the periphery of the latter.

There is another advantage in having the central portion 28 of the runner cavity open to the atmosphere, namely, that in the event that a relatively large quantity of air is drawn into the runner chamber with the material which the pump is handling, and which might interfere with its proper operation, this air may escape to the atmosphere through the sleeve 26 and around the runner shaft passing therethrough.

It should be explained that pumps of this character are adapted to handle pulp or water mixed with sand and other material with which metallic values are found mixed, either in placer mining or in handling old mill dumps, which are located in lakes or rivers. This coarse material naturally subjects the pump to more wear and is very hard on packed joints. Hence, the necessity of doing away with the packing and avoiding as far as possible any rubbing action between the runner shaft and the casing of the pump.

Pumps of this character are intended to handle material which is located above the pump and which passes by gravity and through an opening 61 into a chamber 62 and thence into the runner chamber where it is expelled by centrifugal force developed by the rotation of the runner and is carried upwardly to the desired location for treatment through the standpipe. This gravity action prevents the necessity for maintaining a partial vacuum in the center of the runner or in the cavity 28 thereof, since normally or when the pump is in operation the runner chamber will be full or approximately full of liquid. Hence, atmospheric communication with the cavity 28 of the runner when the machine is in operation is not objectionable, and by maintaining this open condition between the center of the runner and the atmosphere rubbing or wearing action between the shaft and a stationary packed joint, is avoided.

Assuming that the governor mechanism is employed and connected to shift the sleeve 26 endwise as illustrated, when the pump is at rest, the inner extremity of the sleeve 26 will be in contact with the packing 29 and the governor members 47 will be in the position shown in Figs. 1 and 4. However, as soon as the pump is started, the centrifugal force due to the rotation of the runner shaft will cause the governor members to move into their sector shaped openings in the disk 49 and this movement will shift the sleeve 26 endwise and disengage its inner extremity from the packing 29 as illustrated in Fig. 9. But in this event the material handled by the pump and of a liquid or semi-liquid nature will not pass from the central portion 28 of the runner cavity through the sleeve to the atmosphere, since the centrifugal force is sufficient in the central portion 28 of the cavity within the runner to prevent this result. By employing the flexible diaphragm 34 and securely connecting the same with the sleeve 26, this sleeve is shiftable endwise and laterally as may be required, without any rubbing action between it and a bearing member, since the flexible diphragm which carries the sleeve, functions to permit this result.

Having thus described my invention, what I claim is:

1. A centrifugal pump having a sealable joint within the runner to prevent the escape of liquid from the runner chamber around the runner shaft, the pump having a casing member projecting toward the runner and coöperating therewith to form said joint.

2. A centrifugal pump having a sealable joint within the runner to prevent the escape of liquid from the runner chamber around the runner shaft, the pump having a casing member projecting toward the runner and coöperating therewith to form said joint, said casing member being hollow to receive the runner shaft which is spaced from said member.

3. A centrifugal pump having a sealable joint within the runner to prevent the escape of liquid from the runner chamber around the runner shaft, the pump having a casing member projecting toward the runner and coöperating therewith to form said joint, said casing member being hollow to receive the runner shaft which is spaced from said member, the latter being endwise shiftable to open and close said joint.

4. A centrifugal pump having a sealable joint within the runner to prevent the escape of liquid from the runner chamber around the runner shaft, the pump having a casing member projecting toward the runner and coöperating therewith to form said joint, said casing member being hollow to receive the runner shaft which is spaced from said member, the latter being endwise shiftable to open and close said joint, and governor mechanism for effecting said movement.

5. A centrifugal pump, having an opening in the casing, through which the runner shaft passes, said opening communicating with the central portion of the cavity of the runner, the latter being constructed to cause the said opening at all times to be kept free from liquid by the centrifugal action of the runner, and a sealable joint to automatically cut off communication between said opening and the runner cavity when the pump is inactive.

6. A centrifugal pump, whose casing is provided with an opening through which the runner shaft passes, said opening communicating with a recess in the central part of the runner which is constructed to cause the opening to be kept free from liquid at all times by the centrifugal action of the runner.

7. In a centrifugal pump the combination with the runner and operating shaft, of a hollow member through which the shaft passes, said member coöperating with the runner to form a joint and being endwise shiftable to open and close the joint, and a centrifugally operated governor for imparting the endwise movement to said hollow member.

8. In a centrifugal pump the combination with the runner and operating shaft, of a hollow member through which the shaft passes, said member coöperating with the runner to form a joint and being endwise shiftable to open and close the joint, a centrifugally operated governor for imparting the endwise movement to said hollow member, and a flexible diaphragm upon which the hollow member is mounted.

9. A centrifugal pump having a sealable joint within the runner, and means for automatically opening and closing said joint.

10. A centrifugal pump having a sealable joint within the runner and means for automatically opening and closing said joint, the joint when open placing the central part of the runner chamber in communication with the atmosphere.

11. In a centrifugal pump the combination with the runner and its shaft, of a joint centrally located in the runner chamber, means coöperating with the runner to form said joint, and means for automatically opening and closing said joint, the runner chamber being in communication with the atmosphere when the joint is open.

12. In a centrifugal pump the combination with the runner, its shaft and a stationary frame work supporting the runner chamber, of a sleeve surrounding the runner shaft spaced therefrom and projecting toward the runner to form a sealable joint, and a flexible diaphragm mounted on the framework and supporting said sleeve.

13. In a centrifugal pump the combination with the runner, its shaft and a stationary frame work supporting the runner chamber, of a sleeve surrounding the runner shaft spaced therefrom and projecting toward the runner to form a sealable joint, and a flexible diaphragm mounted on the frame work and supporting said sleeve, and means for automatically shifting the sleeve endwise to open and close said joint.

14. A centrifugal pump whose casing is provided with an unsealed opening through which the shaft passes, and a member mounted to rotate with the shaft adjacent to said opening and so constructed as to keep the opening free from liquid by centrifugal force, and means to prevent the escape of liquid through said opening when the pump is inactive.

15. The combination in a centrifugal pump whose casing is provided with an opening through which the shaft passes, of a centrally recessed member, said opening communicating with the recess in said member, and means rotatable with the shaft and adapted to coöperate with said recess to cause said opening to be kept free from liquid by the centrifugal action of said means.

16. The combination in a centrifugal pump whose casing is provided with an opening through which the shaft passes, of a centrally recessed member, said opening communicating with the recess in said member and with the runner chamber, and means rotatable with the shaft and adapted to coöperate with said recess to cause said opening to be kept free from liquid by the centrifugal action of said means.

17. The combination in a centrifugal pump whose casing is provided with an opening through which the shaft passes, of a centrally recessed member, said opening communicating with the recess in said member, means rotatable with the shaft and adapted to coöperate with said recess to cause said opening to be kept from from liquid by the centrifugal action of said means, and means to prevent the escape of liquid through said opening when the pump is inactive.

18. The combination in a centrifugal pump whose casing is provided with an opening through which the shaft passes, of a centrally recessed member, said opening communicating with the recess in said member, means rotatable with the shaft and adapted to coöperate with said recess to cause said opening to be kept free from liquid by the centrifugal action of said means, and a sealable joint to prevent the escape of liquid through said opening when the pump is inactive.

19. The combination in a centrifugal pump whose casing is provided with an opening through which the shaft passes, of a centrally recessed member, said opening communicating with the recess in said member, means rotatable with the shaft and adapted to coöperate with said recess to cause said opening to be kept free from liquid by the centrifugal action of said means, a sealable joint to prevent the escape of liquid through said opening when the pump is inactive, and means for automatically opening and closing said joint.

20. The combination in a centrifugal pump whose casing is provided with an opening through which the shaft passes, of a centrally recessed member, said opening communicating with the recess in said member, means rotatable with the shaft and adapted to coöperate with said recess to cause said opening to be kept free from liquid by the centrifugal action of said means, and means for automatically preventing the escape of liquid through said opening when the pump is inactive.

21. The combination in a centrifugal pump whose casing is provided with an opening through which the shaft passes, of a centrally recessed member, said opening communicating with the recess in said member, means rotatable with the shaft and adapted to coöperate with said recess to cause said opening to be kept free from liquid by the centrifugal action of said means, a sealable joint to prevent the escape of liquid through said opening when the pump is inactive, one part of the joint being mounted on the shaft and the other part being shiftable in the direction of the axis of the shaft to open and close said joint.

22. The combination in a centrifugal pump whose casing is provided with an opening through which the shaft passes, of a centrally recessed member, said opening communicating with the recess in said member, means rotatable with the shaft and adapted to coöperate with said recess to cause said opening to be kept free from liquid by the centrifugal action of said means, a sealable joint to prevent the escape of liquid through said opening when the pump is inactive, one part of the joint being mounted on the shaft and the other part being shiftable in the direction of the axis of the shaft to open and close said joint, and a centrifugally operated governor for imparting said movement to said joint part.

23. The combination in a centrifugal pump whose casing is provided with an opening through which the shaft passes, of a centrally recessed member, said opening communicating with the recess in said member, means rotatable with the shaft and adapted to coöperate with said recess to cause said opening to be kept free from liquid by the centrifugal action of said means, a sealable joint to prevent the escape of liquid through said opening when the pump is inactive, one part of the joint being mounted on the shaft, and a flexible diaphragm upon which the other part of the joint is mounted whereby the said last named joint part is movable in the direction of the axis of the shaft.

24. The combination in a centrifugal pump whose casing is provided with an opening through which the shaft passes, of a centrally recessed member, said opening communicating with the recess in said member, means rotatable with the shaft and adapted to coöperate with said recess to cause said opening to be kept free from liquid by the centrifugal action of said means, a sealable joint to prevent the escape of liquid through said opening when the pump is inactive, one part of the joint being mounted on the shaft, a flexible diaphragm upon which the other part of the joint is mounted whereby the said last named joint part is movable in the direction of the axis of the shaft, and means for automatically imparting said movement.

25. The combination in a centrifugal pump whose casing is provided with an opening through which the shaft passes, of a centrally recessed member, said opening communicating with the recess in said member, means rotatable with the shaft and adapted to coöperate with said recess to cause said opening to be kept free from liquid by the centrifugal action of said means, a sealable joint to prevent the escape of liquid through said opening when the pump is inactive, one part of the joint being mounted on the shaft, a flexible diaphragm upon which the other part of the joint is mounted whereby the said last named joint part is movable in the direction of the axis of the shaft, and a centrifugally operated governor for imparting said movement.

In testimony whereof I affix my signature.

ARTHUR R. WILFLEY.